US010227108B2

(12) United States Patent
Bostwick, IV

(10) Patent No.: US 10,227,108 B2
(45) **Date of Patent: *Mar. 12, 2019**

(54) METHODS AND APPARATUS TO COUPLE COMPONENTS TO A FUEL TANK

(71) Applicant: Brunswick Corporation, Lake Forest, IL (US)

(72) Inventor: Christopher Bostwick, IV, Rockford, MI (US)

(73) Assignee: BRUNSWICK CORPORATION, Lake Forest, IL (US)

(*) Notice: Subject to any disclaimer, the term of this patent is extended or adjusted under 35 U.S.C. 154(b) by 66 days.

This patent is subject to a terminal disclaimer.

(21) Appl. No.: 15/065,118

(22) Filed: Mar. 9, 2016

(65) Prior Publication Data

US 2016/0185425 A1 Jun. 30, 2016

Related U.S. Application Data

(63) Continuation of application No. 13/763,258, filed on Feb. 8, 2013, now Pat. No. 9,316,354.

(51) Int. Cl.
*B60K 15/03* (2006.01)
*B63B 9/00* (2006.01)
(Continued)

(52) U.S. Cl.
CPC ............ *B63B 9/00* (2013.01); *B63B 17/0027* (2013.01); *F17C 3/00* (2013.01); *Y10T 137/0402* (2015.04); *Y10T 137/86236* (2015.04)

(58) Field of Classification Search
CPC .............. B60K 15/03; B60K 15/03177; B60K 2015/03453; B60K 2015/03217;
(Continued)

(56) References Cited

U.S. PATENT DOCUMENTS 6,571,978 B1 * 6/2003 Puempel .......... B60K 15/03177 220/562
7,318,445 B2 * 1/2008 Ohshiro ............... B60K 15/035 137/202

(Continued)

FOREIGN PATENT DOCUMENTS

DE 112010006001 * 5/2012
WO WO2012066646 * 5/2012

OTHER PUBLICATIONS

United States Patent and Trademark Office, "Notice of Allowance," issued in connection with U.S. Appl. No. 13/763,265, dated Nov. 16, 2016, 11 pages.

(Continued)

*Primary Examiner* — Shawn M Braden
(74) *Attorney, Agent, or Firm* — Hanley, Flight & Zimmerman, LLC

(57) ABSTRACT

Apparatus and methods to couple fuel components to a fuel tank are described. An example method includes coupling a carrier to a guide suspended in a cavity of a fuel tank, where the guide extends in a longitudinal direction between a first end of the guide adjacent a first side wall of the fuel tank and a second end of the guide adjacent a second side wall of the fuel tank opposite the first side wall, and moving the carrier along the guide between the first end of the guide and the second end of the guide.

24 Claims, 9 Drawing Sheets

(51) Int. Cl.
*F17C 3/00* (2006.01)
*B63B 17/00* (2006.01)

(58) Field of Classification Search
CPC ........... B60K 2015/03243; B60K 2015/03467; F02M 37/103; F02M 37/0094; F02M 37/0011; F02M 37/0082
USPC .......................... 137/202, 199, 197, 578, 590
See application file for complete search history.

(56) References Cited

U.S. PATENT DOCUMENTS

| | | | |
|---|---|---|---|
| 8,276,778 B2 | 10/2012 | Eulitz et al. | |
| 8,561,596 B2 | 10/2013 | White | |
| 8,789,719 B2 | 7/2014 | Whelan | |
| 8,807,162 B2 | 8/2014 | Monterrey | |
| 9,316,354 B2 | 4/2016 | Bostwick, IV | |
| 9,347,403 B2 * | 5/2016 | Kimoto | B60K 15/03177 |
| 9,605,803 B2 | 3/2017 | Bostwick, IV et al. | |
| 2005/0127078 A1 | 6/2005 | Vorenkamp | |
| 2009/0230133 A1 | 9/2009 | Takeuchi | |
| 2010/0116366 A1 | 5/2010 | Gattozzi | |
| 2012/0006815 A1 * | 1/2012 | Sendlhofer | B60K 15/077 220/4.14 |
| 2013/0161332 A1 * | 6/2013 | Yager | B60K 15/03 220/562 |
| 2014/0224345 A1 | 8/2014 | Bostwick | |
| 2014/0224346 A1 | 8/2014 | Bostwick, IV et al. | |
| 2015/0151631 A1 | 6/2015 | Vulkan | |

OTHER PUBLICATIONS

United States Patent and Trademark Office, "Non-Final Office Action," issued in connection with U.S. Appl. No. 13/763,265 dated Apr. 21, 2016, 12 pages.

United States Patent and Trademark Office, "Requirement for Restriction/Election," issued in connection with U.S. Appl. No. 13/763,258, dated Jul. 1, 2015, 6 pages.

United States Patent and Trademark Office, "Non-Final Office Action," issued in connection with U.S. Appl. No. 13/763,258, dated Nov. 4, 2015, 20 pages.

United States Patent and Trademark Office, "Non-Final Office Action," issued in connection with U.S. Appl. No. 13/763,265, dated Oct. 30, 2015, 22 pages.

United States Patent and Trademark Office, "Final Office Action," issued in connection with U.S. Appl. No. 13/763,265, dated Jan. 21, 2016, 19 pages.

United States Patent and Trademark Office, "Final Office Action," issued in connection with U.S. Appl. No. 13/763,258, dated Jan. 21, 2016, 14 pages.

United States Patent and Trademark Office, "Advisory Action," issued in connection with U.S. Appl. No. 13/763,265, dated Feb. 22, 2016, 3 pages.

United States Patent and Trademark Office, "Notice of Allowance," issued in connection with U.S. Appl. No. 13/763,258, Feb. 26, 2016, 28 pages.

United States Patent and Trademark Office, "Final Office Action," issued in connection with U.S. Appl. No. 13/763,265, dated Aug. 1, 2016, 11 pages.

* cited by examiner

METHODS AND APPARATUS TO COUPLE COMPONENTS TO A FUEL TANK

CROSS-REFERENCE TO RELATED APPLICATION

This patent arises from a continuation of U.S. patent application Ser. No. 13/763,258, filed on Feb. 8, 2013, titled METHODS AND APPARATUS TO COUPLE COMPONENTS TO A FUEL TANK, which is incorporated herein by reference in its entirety.

FIELD OF THE DISCLOSURE

This patent relates generally to fuel tanks and, more specifically, to methods and apparatus to couple components to a fuel tank.

BACKGROUND

Boats and other marine crafts typically employ a fuel system and/or an evaporative control system having multiple fuel components (e.g., valves) that extend through an external surface (e.g., an upper surface) of a fuel tank. For example, a fuel component such as a grade valve may be coupled to a first end of the fuel tank and another fuel component such as a fuel fill apparatus may be coupled to another end (e.g., the upper surface) of the fuel tank opposite the first end. Although the fuel components may each employ a seal to prevent evaporative emissions from escaping or passing through an interface between the fuel components and the fuel tank, government agencies (e.g., the U.S. Coast Guard, Department of Transportation) have enacted regulations (e.g., title 33 of the Code of Federal Regulations) that require the fuel components coupled to external or outer surfaces of the fuel tank to be accessible for inspection and/or servicing. As a result, multiple access panels may be needed in a marine vehicle to access different fuel components positioned on different ends or areas of the fuel tank, thereby increasing costs.

DETAILED DESCRIPTION

Figure 1:
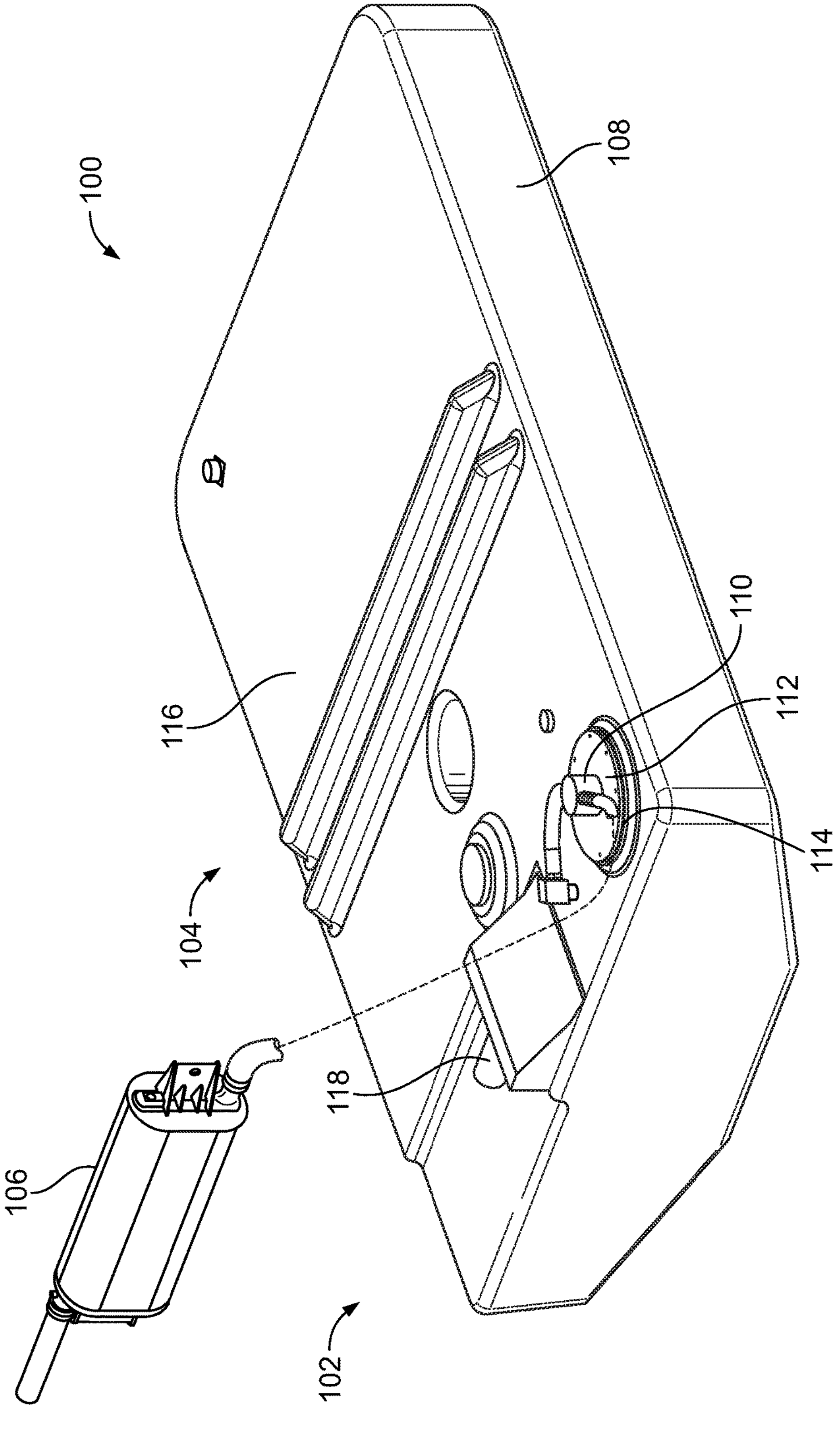
FIG. 1 illustrates an example fuel tank assembly constructed in accordance with the teachings disclosed herein.

Marine fuel tanks typically employ fuel systems and/or evaporative control systems having fuel components to vent fuel vapors to the atmosphere and/or to enable refueling of a fuel tank. For example, a vent is often employed to equalize a pressure in the fuel tank to accommodate for volumetric changes (e.g., expansion) in the fuel tank during a filling event and/or during temperature fluctuations (e.g., diurnal emissions). The fuel vapors in the fuel tank may be displaced to, for example, the atmosphere and/or a vapor collection apparatus via the fuel components.

Typically, to fluidly couple a cavity of the fuel tank to a vent and/or a vapor collection apparatus, fuel components are often coupled to a wall (e.g., an upper wall) of a fuel tank. However, a fuel component coupled to a wall of the fuel tank provides an opening in the wall through which fuel vapors may escape or emit to the atmosphere, resulting in leakage or release of hydrocarbons or other pollutants to the atmosphere. To prevent emissions or leakage of fuel vapors through an opening in a wall of a fuel tank, a fuel component coupled to the opening of the wall typically employs a gasket and/or a seal. However, in some instances, the seal may fail, erode and/or become dislodged, thereby allowing fuel vapors to escape.

As a result, because the seal may fail, some governmental regulations (e.g., enacted by the U.S. Coast Guard, Department of Transportation) require each fuel component coupled to an opening of a wall of a fuel tank to be accessible for inspection and/or servicing. Typically, some fuel components (e.g., a grade valve) are often positioned on the fuel tank opposite other fuel components (e.g., a fuel fill apparatus or vent valve). Thus, to provide accessibility to multiple fuel components coupled to a wall of a fuel tank, multiple access plates and/or panels may be needed to comply with the government regulations. However, having multiple access panels or openings in a marine vehicle may increase manufacturing costs and/or be aesthetically unappealing.

The example methods and apparatus disclosed herein significantly reduce or eliminate the need to provide multiple access panels and/or openings to a marine vehicle. More specifically, multiple access panels and/or openings are not required to provide access to the plurality of fuel components because at least one of the fuel components is to be positioned and/or disposed inside a cavity of a fuel tank without being coupled to the fuel tank via an opening extending through a wall of the fuel tank. In other words, by positioning the fuel component inside the cavity of the fuel tank, a coupling or opening in the wall of the fuel tank that would otherwise be needed to couple the fuel component to the fuel tank is eliminated. For example, the example fuel tank apparatus disclosed herein may employ only one opening through a wall of the fuel tank, which may provide an access port to access at least one fuel component positioned in the cavity. As a result, the example fuel tank apparatus disclosed herein may require only one access panel or opening to access the fuel components which, in some instances, may significantly reduce manufacturing costs and/or eliminate a need to provide aesthetically unappealing access panels to a floor and/or other surface of the marine craft or vehicle.

As used herein, a "fluid" includes, but is not limited to, a liquid such as fuel (e.g., gasoline), a vapor such as fuel vapor (e.g., gasoline vapor), a gas (e.g., air) and/or any combination or mixture thereof.

FIG. 1 illustrates an example fuel system 100 in accordance with the teachings described herein. The example fuel system 100 of FIG. 1 includes an evaporative control system 102 fluidly coupled to a fuel tank assembly 104. For example, the evaporative control system 102 significantly limits or prevents evaporative emissions (e.g., hydrocarbons) from emitting to the environment or atmosphere. A vapor collection apparatus 106 (e.g., a carbon canister) filters the evaporative emissions (e.g., hydrocarbons) that vent to the atmosphere. More specifically, the vapor collection apparatus 106 may have an emission(s)-capturing or filter material (e.g., an adsorbent material) such as, for example, activated carbon, charcoal, etc., that collects and stores the evaporative emissions. The stored emissions are carried back to a fuel tank 108 of the fuel tank assembly 104 as air flows from the atmosphere into the fuel tank 108 (e.g., during vacuum). A fuel component 110 (e.g., a vent valve) of the fuel tank assembly 104 of the illustrated example fluidly couples the vapor collection apparatus 106 and the fuel tank 108.

As illustrated in FIG. 1, the fuel component 110 is positioned on a cover or clamp 112 that is coupled to an opening 114 formed in a wall 116 of the fuel tank 108. As disclosed in greater detail below, the fuel component 110 is fluidly coupled to one or more fuel components disposed inside the fuel tank 108 to allow fuel vapors and/or air to flow between the fuel tank 108 and the atmosphere (e.g., via the evaporative control system). Additionally, the fuel tank 108 may include a deck fill opening 118 of the fuel tank 108 adjacent the opening 114 to receive a fuel fill apparatus. In other examples, the fuel fill apparatus may be coupled to the cover 112.

Figure 2:
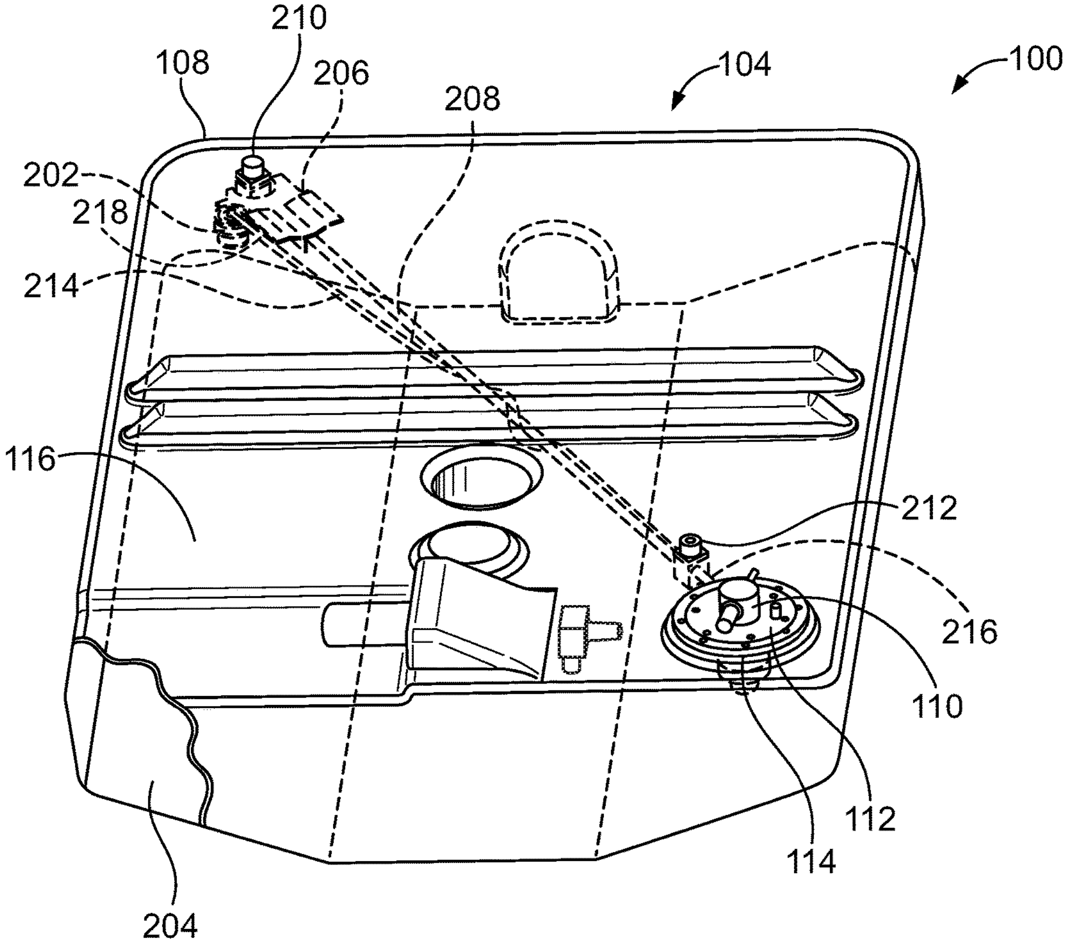
FIG. 2 is a perspective view of the example fuel tank assembly of FIG. 1 having an example fuel component positioned inside a cavity of a fuel tank.

FIG. 2 is a perspective view of the example fuel tank assembly 104 of FIG. 1 illustrating internal components in dashed lines. The example fuel tank assembly 104 includes a fuel component 202 (e.g., a vent valve, a grade valve, etc.) positioned and/or disposed in a cavity 204 of the fuel tank 108. To position the fuel component 202 in the cavity 204, the fuel component 202 is coupled to a carrier 206, which is movably or slideably coupled to a guide, channel, carrier, track or other structure forming a path 208 (e.g., a pipe, conduit or support structure). In other words, the carrier 206 supports the fuel component 202 in the cavity 204 of the fuel tank 108. The guide 208 is positioned or formed (e.g., via insert molding or integrally formed via molding) within the cavity 204 of the fuel tank 108. In the illustrated example, the guide 208 may be coupled to the wall 116 of the fuel tank 108 via a plurality of guide support connectors or mounts 210 and 212 (e.g., fasteners, bosses and/or other structure(s) or anchors). The opening 114 of the fuel tank 108 provides access to the cavity 204 and/or the guide 208.

A flexible coupling 214 (e.g., a hose or tubing) fluidly couples the fuel components 110 and 202. In particular, a first end 216 of the flexible coupling 214 is coupled to the fuel component 110 and a second end 218 of the flexible coupling 214 (opposite the first end 216) is coupled to the fuel component 202. As described in greater detail below, the fuel component 202 is coupled to the carrier 206. The carrier 206 is coupled to the guide 208 and positions the fuel component 202 in the cavity 204 of the fuel tank 108 at a position spaced away from the opening 114. With the component 202 positioned in the cavity 204, the cover 112 is attached, clamped, screwed and/or otherwise coupled to the opening 114. Although not shown, in some examples, the carrier 206 may be configured to receive a plurality of fuel components to position the fuel components in the cavity 204 of the fuel tank 108. In some examples, a plurality of fuel components may be positioned in the cavity 204 via a plurality of carriers 206 positioned on a plurality of guide 208 provided in the cavity 204.

Figure 3:
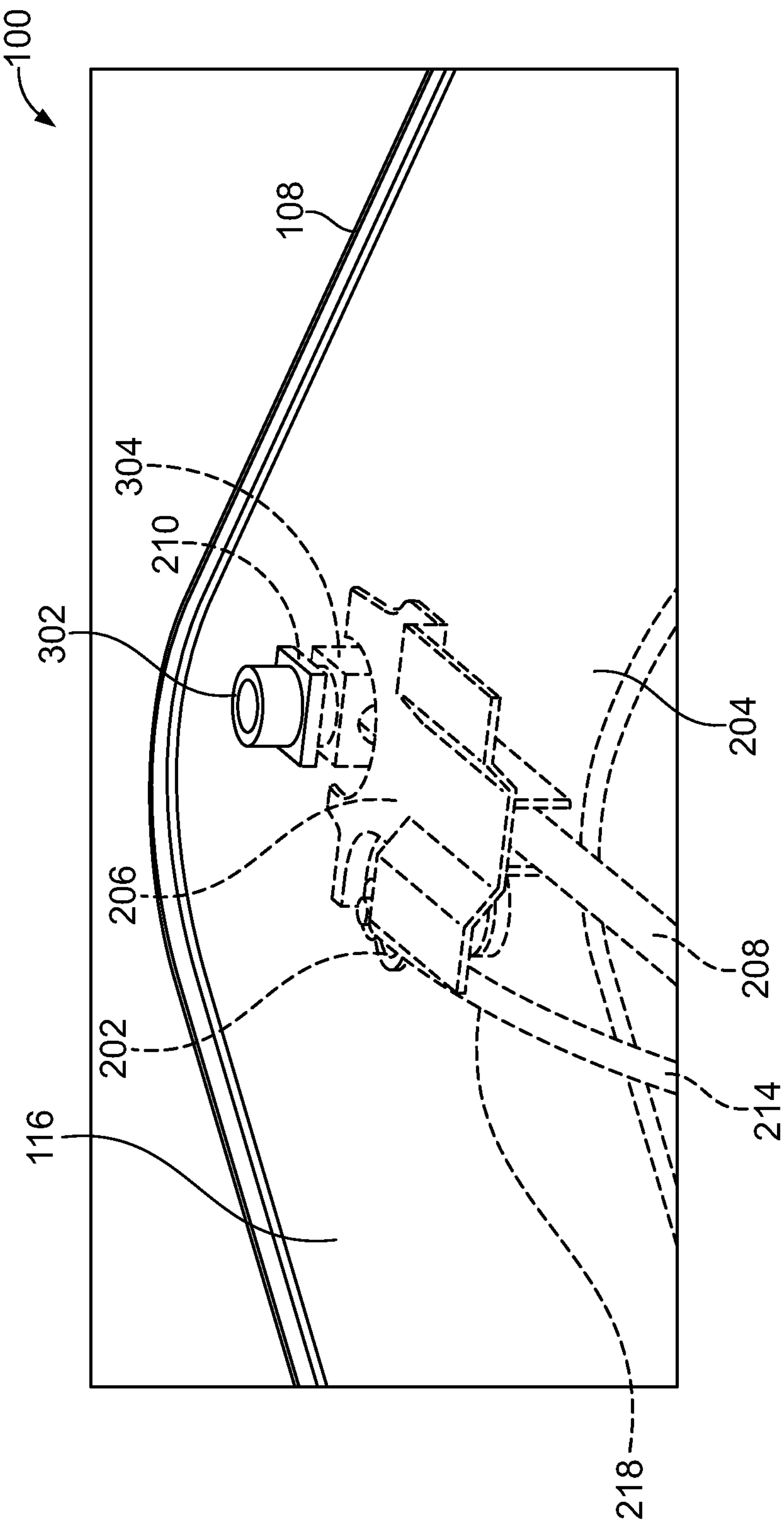
FIG. 3 is an enlarged view of the example fuel tank assembly of FIGS. 1 and 2.

FIG. 3 is an enlarged view of the fuel tank 108. As shown in FIG. 3, the guide support connector 210 is coupled to the wall 116 of the fuel tank 108. More specifically, an upper or outer portion 302 of the guide support connector 210 extends from an outer surface of the wall 116 and a lower or inner portion 304 of the guide support connector 210 extends from an inner surface of the wall 116 and is disposed in the cavity 204 of the fuel tank 108. In particular, the lower portion 304 of the guide support connector 210 is coupled to the guide 208. The carrier 206 is movably or slideably coupled to the guide 208 and is positioned between the guide 208 and the wall 116 of the fuel tank 108. The carrier 206 enables the fuel component 202 to be positioned substantially adjacent or near the wall 116 of the fuel tank 108.

Figure 4:
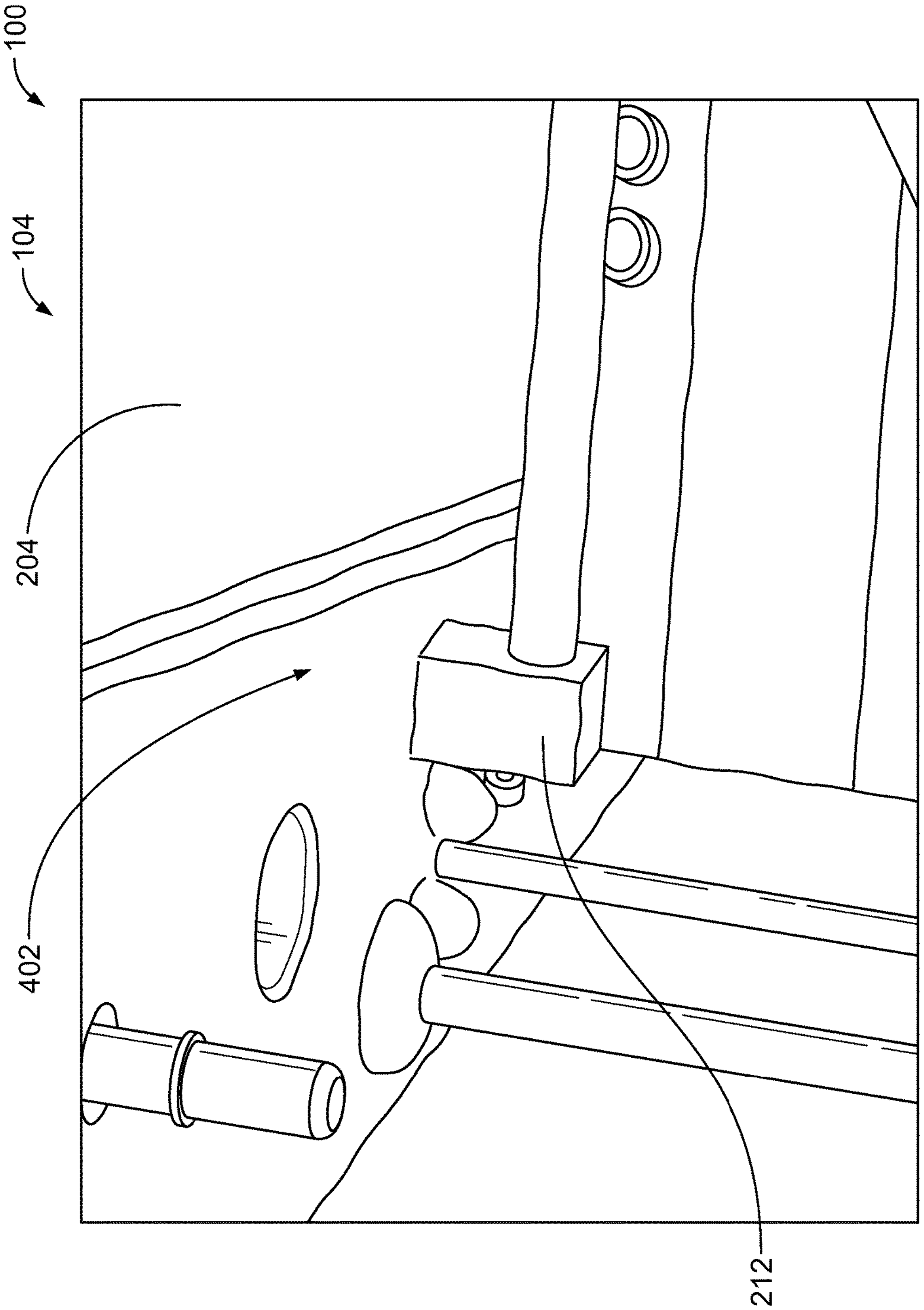
FIG. 4 is an enlarged cross-sectional view of the example fuel tank assembly of FIGS. 1-3 showing an interior surface of the cavity.

FIG. 4 illustrates the guide support bracket 212 positioned inside the cavity 204 after the fuel tank 108 is formed. The fuel tank 108 may be composed of, for example, polyethylene and/or any other substantially rigid and/or flexible material. The fuel tank 108 may be formed via, for example, rotational molding, blow molding and/or any other suitable manufacturing process(es). For example, the guide 208 and/or the guide support connectors 210 and 212 may be positioned in a mold prior to the formation of the fuel tank 108. In other words, the guide 208 and/or the guide support connectors 210 and 212 may be insert molded with the fuel tank 108. When insert molded, the guide support connectors 210 and 212 are over molded with a material 402 from which the fuel tank 108 is composed, thereby providing a tight seal and eliminating any openings or passageways between the cavity 204 and the wall 116 of the fuel tank 108 via the guide support connectors 210 and 212 even though a portion of the guide support connectors 210 and 212 extend from an exterior of the wall 116 (see FIGS. 1 and 2). In other examples, the guide 208 and/or the guide support connectors 210 and 212 may be coupled to the fuel tank 108 via any manufacturing process(es) or technique(s) where coupling the guide support connectors 210 and 212 to the fuel tank 108 does not create or require formation of an opening through the wall 116 of the fuel tank 108.

Additionally or alternatively, the guide 208 may be integrally formed with the fuel tank 108 via, for example, injection molding. For example, the guide 208 may be integrally formed with the fuel tank 108 such that the guide 208 projects from the inner surface of the wall 116 and into the cavity 204. In some examples, the fuel tank 108 may be formed via injection molding in separate parts or halves (e.g., two pieces) and subsequently coupled together via, for example, plastic welding.

Additionally, the opening 114 may be formed or provided during the molding operation when forming the fuel tank 108. Alternatively, the opening 114 may be formed via secondary manufacturing operations such as, for example, boring, drilling and/or any other suitable manufacturing process(es).

Providing the fuel component 202 in the cavity 204 of the fuel tank 108 eliminates the need to provide multiple access panels to a marine vehicle. More specifically, an access panel is not required to provide access to the fuel component 202 and/or the guide support connectors 210 and 212 because the fuel component 202 and/or the guide support connectors 210 and 212 do not form openings or passageways through the wall 116 of the fuel tank 108 from which fuel vapors in the cavity 204 can escape to the atmosphere. In other words, by positioning the fuel component 202 inside the cavity 204 and overmolding the guide support connectors 210 and 212 with the material of the fuel tank 108, a coupling or opening in the wall 116 of the fuel tank 108 that would otherwise be needed to couple the fuel component 202 and/or the guide 208 to the fuel tank 108 is eliminated.

Figure 5:
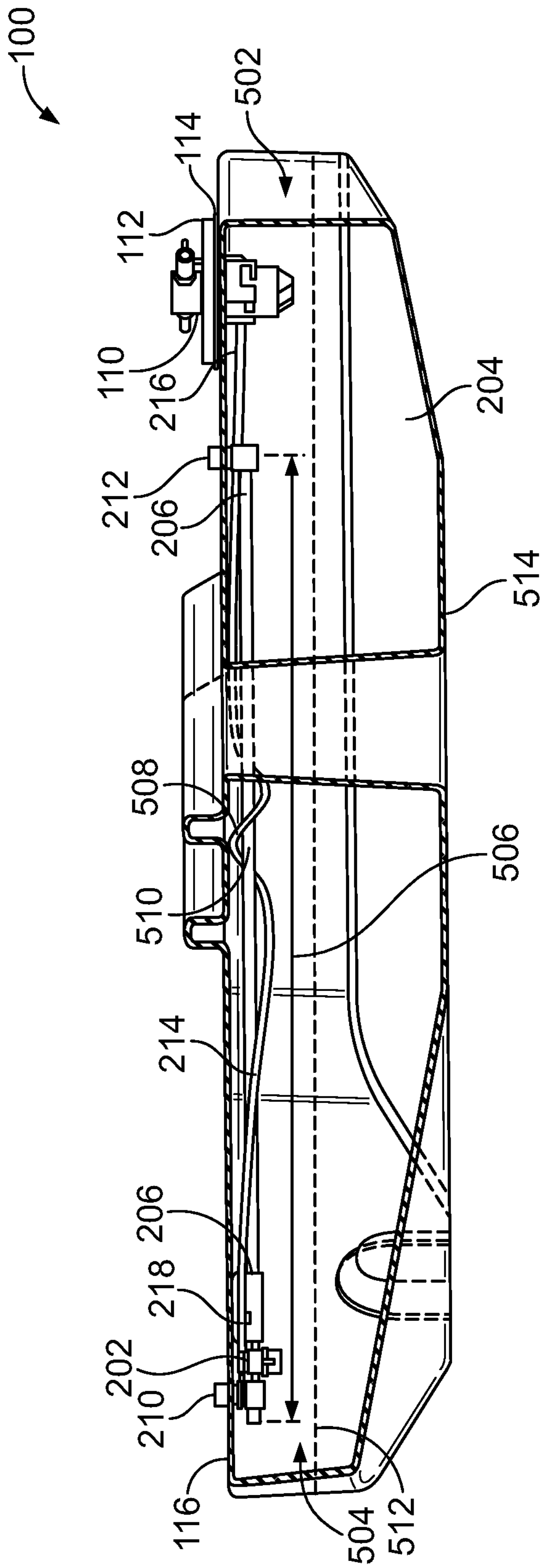
FIG. 5 is a cross-sectional view of the example fuel tank assembly of FIGS. 1-4.

FIG. 5 is a cross-sectional view of the fuel tank 108 of FIGS. 1-5. As shown in FIG. 5, the guide 208 of the fuel tank assembly 104 extends between a first portion or area 502 of the cavity 204 and a second portion or area 504 of the cavity 204. In particular, the first area 502 of the cavity 204 is adjacent to the opening 114 and the second area 504 of the cavity 204 adjacent an end of the fuel tank 108 spaced away from the opening 114 by a distance defined by at least a length 506 of the guide 208. As shown in FIG. 5, the guide 208 is coupled and/or hung in the cavity 204 via the supports 210 and 212. In the illustrated example, the guide 208 is substantially parallel relative to the wall 116. The carrier 206 is positioned on the guide 208 and moves or slides relative to the guide 208 to transport or move the fuel component 202 between the first and second areas 502 and 504. The carrier 206 is positioned on the guide 208 via the opening 114. To prevent the flexible coupling 214 from sagging into the cavity 204, at least a segment 508 of the flexible coupling 214 may be wrapped around a portion 510 of the guide 208.

Additionally or alternatively, the carrier 206 and/or the guide 208 are positioned near the wall 116 of the fuel tank 108 to enable the fuel component 202 to be positioned substantially adjacent the wall 116. For example, a relatively small gap may be provided between the wall 116 and the carrier 206 when the carrier 206 is positioned on the guide 208. As a result, the carrier 206 and the guide 208 enable the fuel component 202 to be positioned at an elevation or height relative to a ullage 512 of the cavity 204 and/or a bottom wall 514 of the fuel tank 108 that does not significantly deviate from an elevation or height of a fuel component that would otherwise be conventionally coupled to the wall 116 via an aperture in the wall 116 of the fuel tank 108. Thus, positioning the fuel component 202 in the cavity 204 and spaced away from the inner surface of the wall 116 by a relatively small distance does not hinder or affect an operation of the fuel component 202. In other words, the fuel component 202 provides a substantially similar or equivalent function compared to a fuel component that would otherwise be conventionally coupled to the wall 116 via an aperture in the wall 116.

In the illustrated example of FIG. 5, the flexible coupling 214 is coupled to the fuel component 110 positioned on the cover 112. In some examples, the first end 216 of the flexible coupling 214 may be coupled to the fuel component 110 via, for example, a connector (e.g., a quick connect/disconnect connector). Because the flexible coupling 214 fluidly couples the fuel component 202 and the fuel component 110, the fuel component 202 is able to vent to the exterior of the fuel tank 108 via the flexible coupling 214 and the fuel component 110.

Figure 6:
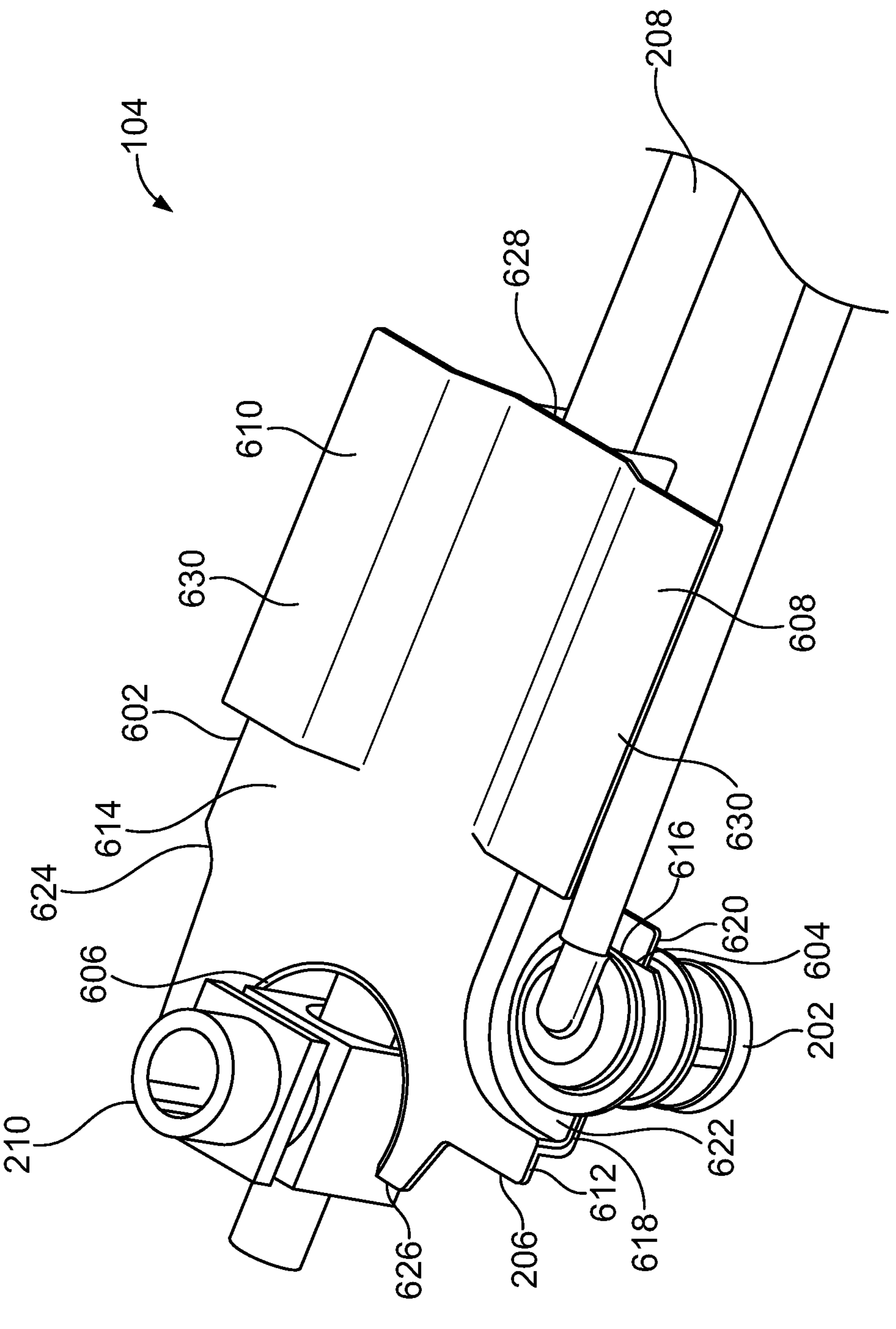
FIG. 6 illustrates an example carrier of the example fuel tank assembly of FIGS. 1-5.

FIG. 6 is an enlarged view of the carrier 206 coupled to the guide 208 of the example fuel tank assembly 104 of FIGS. 1-5. As shown in FIG. 6, the carrier 206 includes a body 602 having a fuel component receiving portion 604, a notch or cutout portion 606 and one or more flanges or wings 608 and 610. The fuel component receiving portion 604 is configured to attach, receive, couple, capture and/or retain the fuel component 202 to the carrier 206. As shown in the illustrated example, the fuel component receiving portion 604 is positioned adjacent a first side 612 of the carrier 206. In this example, the fuel component receiving portion 604 is offset relative to a first or upper surface 614 of the carrier 206 to reduce and/or prevent interference between the fuel component 202 and the wall 116 when the carrier 206 is slid or otherwise moves across the guide 208. In this example, the fuel component receiving portion 604 is a circular or arcuate-shaped opening 616 that defines at least two ends or flanges 618 and 620 to capture and/or retain the fuel component 202 via, for example, a snap-fit or interference connection. Additionally or alternatively, at least one of the flanges 618 and 620 includes a substantially flat surface or portion 622 to receive a complementary flat surface or portion of the fuel component 202 to facilitate orientation of the fuel component 202 relative to the carrier 206 and/or to prevent rotation of the fuel component 202 relative to the carrier 206 about a longitudinal axis of the fuel component 202. Further, the fuel component receiving portion 604 may be shaped and/or configured to capture or retain fuel components having various shapes and/or sizes. As illustrated in FIG. 6, the fuel component receiving portion 604 is substantially similar or complementary to at least a profile of the fuel component 202. In other examples, the fuel component receiving portion 604 may be formed on a second side 624 of the carrier 206. In some examples, a plurality of fuel component receiving portions (e.g., a plurality of fuel component receiving portions 604) may be provided on the first side 612 of the carrier 206 and/or on the second side 624 of the carrier 206. In some such examples, a plurality of fuel components may be captured or coupled to the carrier 206 and positioned in the cavity 204 of the fuel tank 108.

As illustrated in FIG. 6, a first end 626 of the carrier 206 includes the notch or cutout portion 606 to engage (e.g., frictionally engage) the guide support 210 when the carrier 206 is positioned adjacent the support 210. As shown in the example of FIG. 6, the notch or cutout portion 606 is sized to frictionally engage, receive, lock, secure or otherwise couple (e.g., via snap-fit) to the guide support connector 210 to significantly reduce and/or prevent movement (e.g., sliding movement) of the carrier 206 relative to the guide support connector 210 and/or the guide 208 when the example fuel tank assembly 104 is tilted or canted during transportation and/or operation of a marine vehicle.

As shown in FIG. 6, the carrier 206 also employs the plurality of flanges or wings 608 and 610 adjacent a second end 628 of the carrier 206. More specifically, the wing 608 is adjacent the first side 612 of the carrier 206 and the wing 610 is adjacent the second side 624 of the carrier 206. Additionally, the wings 608 and 610 project upwardly and/or outwardly from the upper surface 614 of the carrier 206 such that an upper surface 630 of the wings 608 and 610 is offset or elevated (e.g., vertically or laterally elevated) relative to the upper surface 614 of the body 602.

Figure 7:
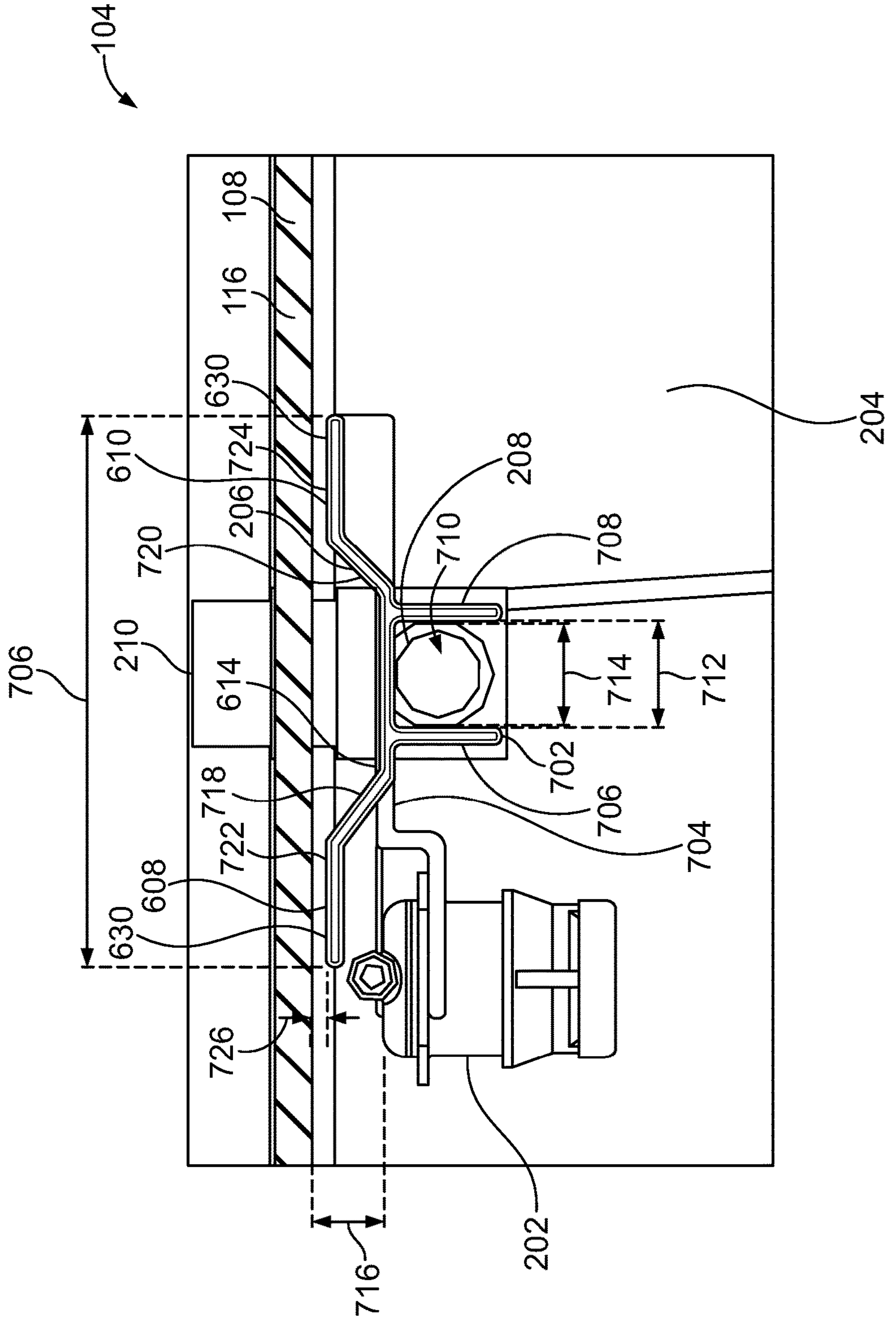
FIG. 7 is a cross-sectional view of the example carrier positioned in the cavity of the example fuel tank assembly of FIGS. 1-6.

FIG. 7 is a side view of the carrier 206 disposed in the cavity 204 of the example fuel tank assembly 104 of FIGS. 1-6 illustrating the position of the carrier 206 in relation to the guide 208 and the wall 116 of the fuel tank 108 when the carrier 206 is coupled to the guide 208. To couple or position the carrier 206 to the guide 208, the carrier 206 employs a guide receiving portion or rail 702. In the illustrated example, the guide receiving portion 702 is positioned on a second or lower surface 704 of the carrier 206 opposite the upper surface 614. In particular, the guide receiving portion 702 includes a plurality of side walls 706 and 708 that extend from the second surface 704 and away from the upper surface 614. In other words, the second surface 704 and the side walls 706 and 708 define an opening or channel 710 (e.g., a U-shaped opening) configured to receive the guide 208.

When coupled to the guide 208, the second surface 704 of the carrier 206 engages the guide 208 and the side walls 706 and 708 engage and/or at least partially surround the guide 208. In some examples, the channel 710 defines a distance 712 between the side walls 706 and 708 that is substantially similar to (e.g., slightly larger than) a size or diameter 714 of the guide 208 such that the guide receiving portion 702 nests on the guide 208. Further, the fuel component receiving portion 604 projects substantially perpendicular relative to the side walls 706 and 708 of the guide receiving portion 702. In other words, the fuel component receiving portion 604 cantilevers or positions the fuel component 202 away from the guide receiving portion 702. Further, the fuel component receiving portion 604 positions the fuel component 202 at a distance 716 (e.g., a vertical distance) from the inner surface of the wall 116 and offset relative to the upper surface 614 to prevent interference between the fuel component 202 and the inner surface of the wall 116 as the carrier 206 moves along the guide 208. As shown, the wings 608 and 610 have respective angled surfaces or portions 718 and 720 that project away from the side walls 706 and 708 of the guide receiving portion 702 and respective walls 722 and 724 projecting from the angled portion 718 and 720.

When the carrier 206 is coupled to the guide 208, the wings 608 and 610 of the carrier 206 substantially prevent the carrier 206 from rotating, tilting and/or canting relative to a longitudinal axis of the guide 208. In other words, the wings 608 and 610 prevent or significantly reduce rotation and/or tilting of the carrier 206 and, thus, the fuel component 202 relative to the guide 208. Thus, the carrier 206 maintains the orientation and/or the alignment of the fuel component 202 relative to the wall 116 and/or the longitudinal axis of the guide 208. To maintain the fuel component 202 substantially aligned with the wall 116, a clearance 726 is provided between the wings 608 and 610 and the wall 116 of the fuel tank 108. The clearance 726 is a distance sufficient to prevent the upper surface 630 of the wings 608 and 610 from frictionally sliding against the inner surface of the wall 116 as the carrier 206 moves along the guide 208. However, the clearance 726 prevents significant tilting and/or canting of the carrier 206 relative to the wall 116 to maintain a longitudinal axis of the fuel component 202 substantially perpendicular relative to the longitudinal axis of the guide 208 and/or the wall 116. In other words, because the clearance 726 (e.g., a vertical distance) is relatively small compared to a span or distance 728 (e.g., a lateral distance) defined by the wings 608 and 610, rotation or tilting of the carrier 206 about the longitudinal axis is significantly reduced or eliminated (i.e., an insignificant amount of rotation). When the carrier 206 rotates relative to the longitudinal axis of the guide 208, one of the wings 608 and 610 engages the wall 116 and prevents further rotation via interference of the one of the wings 608 and 610 and the wall 116.

To couple the carrier 206 to the guide 208, the wall 116 may be flexed and/or deflected in a direction away from the guide 208 to increase a distance or a clearance between the guide 208 and the wall 116. For example, a force may be imparted to the wall 116 via a tool or an operator's hand positioned on the inner surface of the wall 116 via the access opening 114 and/or a tool (e.g., a suction tool) positioned on the outer surface of the wall 116. Deflection of the wall 116 away from the guide 208 provides a clearance or gap to enable the side wall 708 of the guide receiving portion 702 to clear or slide past the guide 208. Once the guide 208 is aligned and/or positioned between the side walls 706 and 708, the force imparted to the wall 116 may be removed or released to cause the wall 116 to deflect or return to its initial or non-deflected position to capture the carrier 206 on the guide 208.

Figure 8:
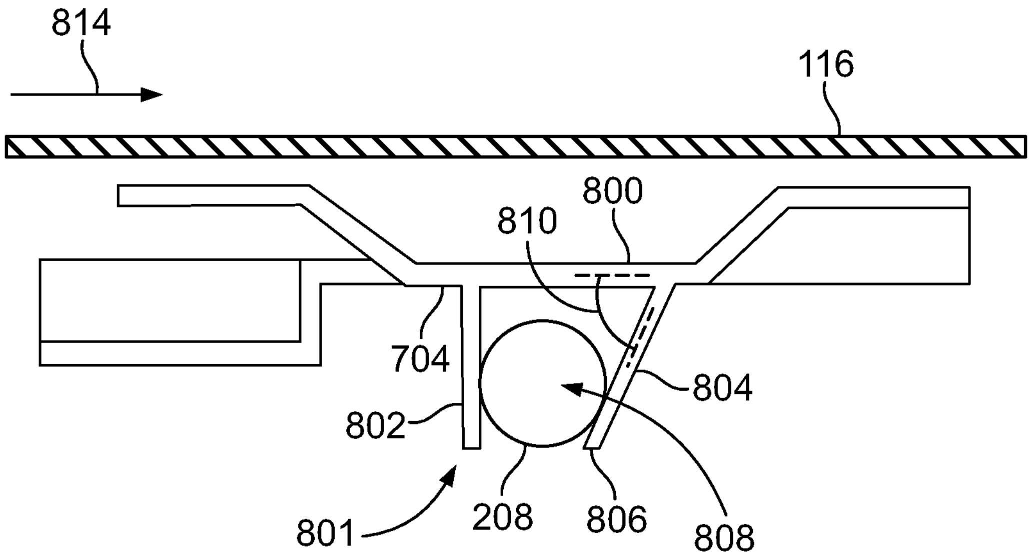
FIG. 8 is an enlarged side view of another example carrier in accordance with the teachings disclosed herein that may be used with the example fuel tank assembly of FIGS. 1-5.

FIG. 8 illustrates another example carrier 800 in accordance with the teachings disclosed herein that may be used with the example fuel tank assembly 100 of FIGS. 1-7. Those components of the example carrier 800 that are substantially similar or identical to the components of the example carrier 206 described above and that have functions substantially similar or identical to the functions of those components will not be described in detail again below. Instead, the interested reader is referred to the above corresponding descriptions. To facilitate this process, the same reference numbers will be used for like structures.

As shown in FIG. 8, a plurality of side walls 802 and 804 of a guide receiving portion 801 extend from a second surface 704 of the carrier 800 to define an opening or channel 808 configured to receive the guide 208. In particular, the side wall 802 is substantially perpendicular relative to the second surface 704 of the carrier 800 and the side wall 804 is substantially non-perpendicular or at an angle relative to the second surface 704. In other words, the side wall 804 is substantially non-parallel relative to the side wall 802. More specifically, the side wall 804 is angled such that an end 806 (e.g., a lower end) of the side wall 804 is directed toward the opposing side wall 802. In particular, an angle 810 formed between the side wall 804 and the second surface 704 may be, for example, between 20 and 80 degrees. In other examples, the side wall 802 may also be substantially non-perpendicular to the second surface 704 and directed toward the opposing side wall 804.

As a result, the side wall 804 facilitates coupling of the carrier 800 to the guide 208. For example, to couple the carrier 800 to the guide 208, the carrier 800 is positioned adjacent the guide 208 and slid in a direction 814 toward the guide 208 (e.g., a substantially horizontal direction perpendicular to the longitudinal axis of the guide 208). As the carrier 800 is slid across the guide 208 in the direction 814, the side wall 804 deflects or bends toward the second surface 704 to allow the side wall 804 to advance past or clear the guide 208. After the end 806 of the side wall 804 moves past or clears the guide 208, the side wall 804 flexes or returns to its initial position such that the guide 208 is captured or positioned between the side walls 802 and 804 and the second surface 704.

Figure 9:
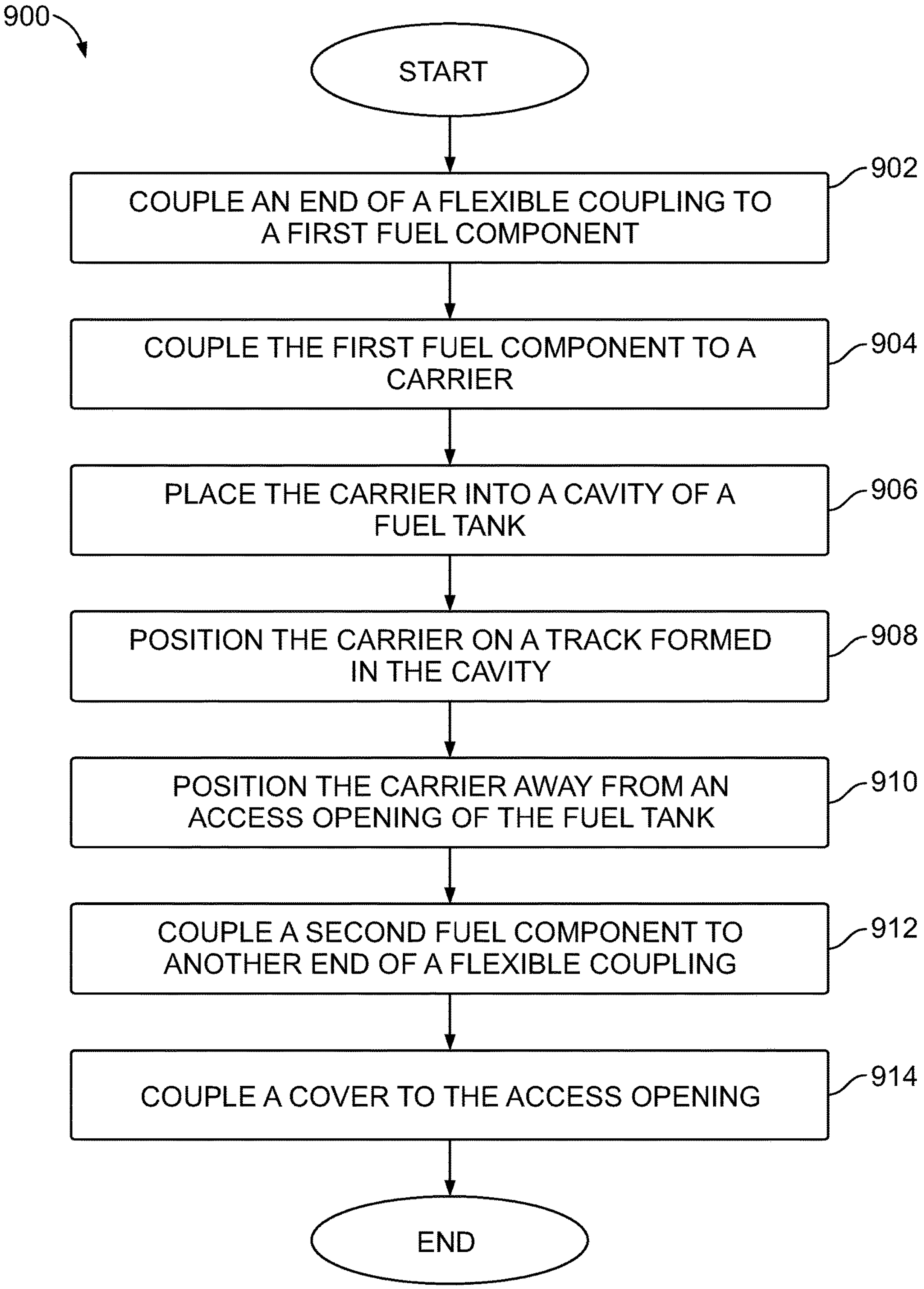
FIG. 9 depicts a flowchart of an example method to assemble an example fuel tank assembly disclosed herein.

FIG. 9 is a flowchart of an example method 900 that may be used to assemble an example fuel tank assembly disclosed herein such as the example fuel tank assembly 102 of FIGS. 1-8. While the example method 900 may be used to assemble an example fuel system herein, one or more of the blocks and/or processes illustrated in FIG. 9 may be combined, divided, re-arranged, omitted, eliminated and/or implemented in any other way. Further still, the example method of FIG. 9 may include one or more processes and/or blocks in addition to, or instead of, those illustrated in FIG. 9, and/or may include more than one of any or all of the illustrated processes and/or blocks. Although the example method 900 is described with reference to the flowchart illustrated in FIG. 9, many other methods of assembling an example fuel tank assembly may alternatively be used. Because the example method 900 may be used to assemble the example fuel tank assembly of FIGS. 1-8, those components identified in FIGS. 1-8 that have functions substantially similar or identical to the functions of those components described below will not be described in detail again. Instead, the interested reader is referred to the above corresponding descriptions. To facilitate this process, the same reference numbers will be used for like structures.

The example method of assembling an example fuel tank assembly disclosed herein is discussed in connection with the example fuel tank assembly 100 of FIGS. 1-8. An example method 900 disclosed herein may begin by coupling an end 218 of a flexible coupling 214 to a fuel component 202 (block 902). The fuel component 202 is then coupled to a carrier 206 (block 904). In some examples, the fuel component 202 may be coupled to the carrier 206 prior to the end 218 of the flexible coupling 214 coupling to the fuel component 202.

After the fuel component 202 is coupled to the carrier 206, the carrier 206 is positioned in a cavity 204 of a fuel tank 108 via an opening 114 adjacent a wall 116 of the fuel tank 108. (block 906). Accordingly, the fuel component 202 and the end 218 of the flexible coupling 214 may be positioned in the cavity 204 of the fuel tank 108 via the carrier 206.

When placed in the cavity 204 of the fuel tank 108, the carrier 206 is slideably coupled to the guide 208 (block 908). To couple the carrier 206 to the guide 208, the carrier 206 is positioned adjacent the guide 208 such that an upper surface 614 of the carrier 206 is adjacent to the wall 116 of the fuel tank 108. In some instances, the wall 116 may be flexed or deflected away from the guide 208 to provide a gap or clearance (e.g., a vertical clearance) to enable the carrier 206 to be positioned between the guide 208 and the wall 116. In some examples, a user may employ a tool that provides a suctioning force to an exterior of the wall 116 to flex the wall 116 away from the guide 208. In other examples, a tool may be at least partially disposed in the cavity 204 to apply a force to an inner surface of the wall 116 to flex the wall 116 away from the guide 208. In other examples, a user may position his hand in the cavity 204 via the opening 114 to deflect the wall 116 away from the guide 208. In such examples, the carrier 206 is positioned near the opening 114, but away from the guide support connector 212 to allow the user to reach into the cavity 204 and apply a force to an interior surface of the wall 116. Alternatively, another example carrier 800 may be employed which can be slid in a direction toward the guide 208 until the carrier 800 is positioned between the guide 208 and the wall 116. The carrier 800 may employ an angled side wall 804 that may bend or flex when the carrier 800 is slide or moved across the guide 208 in a direction 814 substantially perpendicular relative to a longitudinal axis of the guide 208.

After the carrier 206 is slidably coupled to the guide 208, the carrier 206 is directed, slid or moved along the longitudinal axis of the guide 208 to position the carrier 206 away from the opening 114 (block 910). For example, the carrier 206 may slide along the guide 208 until the carrier 206 frictionally engages, snaps, locks, secures or otherwise couples to a guide support connector 210 positioned away from the opening 114 to restrict or prevent the carrier 206 from sliding along the guide 208. In some examples, the carrier 206 may be slid along the guide 208 via a tool that is to be temporarily coupled to or engaged with the carrier 206 and is of sufficient length to reach the guide support connector 210 within the cavity 204 of the fuel tank 108.

After the fuel component 202 is positioned away from the opening 114, a fuel component 110 may couple to a second end 218 of the flexible coupling 214 to fluidly couple the fuel components 110 and 202 (block 912). In some instances, the second end 218 of the flexible coupling 214 may be trimmed or cut to a desired or proper length prior to attaching the fuel component 110 to the second end 218.

After the fuel component 110 is coupled to the flexible coupling 214, a cover 112 may be coupled or attached to the opening 114 to enclose the cavity 204 of the fuel tank 108 (block 914).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:

coupling a carrier to a guide suspended in a cavity of a fuel tank, the guide extending in a longitudinal direction between a first end of the guide adjacent a first side wall of the fuel tank and a second end of the guide adjacent a second side wall of the fuel tank opposite the first side wall; and moving the carrier along the guide between the first end of the guide and the second end of the guide after the carrier is coupled to the guide.

2. The method of claim 1, further comprising coupling a first fuel component to the carrier prior to coupling the carrier to the guide.

3. The method of claim 2, further comprising coupling a flexible coupling to the first fuel component prior to coupling the carrier to the guide.

4. The method of claim 3, further comprising coupling the carrier to the guide via an access opening formed in a wall of the fuel tank.

5. The method of claim 4, further comprising deflecting the wall away from the guide to couple the carrier to the guide.

6. The method of claim 4, further comprising sliding the carrier away from the access opening to position the fuel component adjacent an end of the cavity opposite the access opening.

7. The method of claim 6, further comprising fluidly coupling the first fuel component and a second fuel component via the flexible coupling.

8. The method of claim 7, further comprising coupling the second fuel component to a cover.

9. The method of claim 8, further comprising coupling the cover to the access opening after the second fuel component is coupled to the flexible coupling.

10. A method comprising:

forming a fuel tank with a guide positioned in a cavity of the fuel tank; and forming an access opening in a wall of the fuel tank to provide access to the guide, the guide to extend between a first portion of the cavity adjacent the access opening and a second portion of the cavity spaced from the access opening, the guide having a first end accessible via the access opening and a second end opposite the first end, the guide to removably receive a carrier from outside the cavity via the access opening after formation of the fuel tank.

11. The method of claim 10, further comprising attaching the guide to an interior surface of an upper wall of the fuel tank, the guide extending in a longitudinal direction proximate the upper surface between a first side wall of the fuel tank and a second side wall of the fuel tank.

12. The method of claim 10, wherein forming the fuel tank with the guide comprises providing a first support adjacent the first end of the guide and a second support adjacent the second end of the guide.

13. The method of claim 10, further comprising coupling the carrier to the guide via the access opening.

14. The method of claim 13, further comprising coupling a first fuel component to the carrier.

15. The method of claim 13, further comprising sliding the carrier on the guide between the first end of the guide and the second end of the guide to position a first fuel component adjacent the second portion of the cavity.

16. The method of claim 15, further comprising sliding the carrier along the guide until the carrier engages a support of the guide to restrict or prevent movement of the carrier along the guide after the carrier engages the support of the guide.

17. The method of claim 14, further comprising coupling a first end of a flexible coupling to the first fuel component and a second end of the flexible coupling to a second fuel component.

18. The method of claim 17, further comprising trimming the second end of the flexible coupling prior to coupling the second end to the second fuel component.

19. A method comprising:

coupling a first fuel component to a carrier;

placing the carrier in to a cavity of a fuel tank via an access opening formed through a wall of the fuel tank;

positioning the carrier on a track formed in the cavity, the track defining a first end adjacent the access opening and a second end opposite the first end and spaced from the access opening; and sliding the carrier toward the second end of the track and away from the access opening.

20. The method of claim 19, further comprising attaching a first end of a flexible coupling to the first fuel component prior to coupling the first fuel component to the carrier.

21. The method of claim 20, further comprising attaching a second end of the flexible coupling to a second fuel component.

22. The method of claim 1, further including removably coupling the carrier to the guide via an access opening formed in a wall of the fuel tank after assembly of the fuel tank.

23. The method of claim 10, further including removably positioning a fuel component inside the cavity of the fuel tank via the access opening after forming the fuel tank.

24. A method comprising:

coupling a carrier to a guide suspended in a cavity of a fuel tank, the guide extending in a longitudinal direction between a first end of the guide adjacent a first side wall of the fuel tank and a second end of the guide adjacent a second side wall of the fuel tank opposite the first side wall; and moving the carrier along the guide between the first end of the guide and the second end of the guide while the carrier is coupled to the guide.

* * * * *